June 19, 1956  
J. W. MILLINGTON  
2,751,573  
APPARATUS FOR CHANGING THE RESONANT  
FREQUENCY OF A SEISMIC DETECTOR  
Filed Feb. 1, 1952  
2 Sheets-Sheet 1

INVENTOR.
JOHN W. MILLINGTON
BY
ATTORNEYS.

INVENTOR.
JOHN W. MILLINGTON

United States Patent Office 2,751,573
Patented June 19, 1956

2,751,573

APPARATUS FOR CHANGING THE RESONANT FREQUENCY OF A SEISMIC DETECTOR

John W. Millington, Beaumont, Tex., assignor to Sun Oil Company, Philadelphia, Pa., a corporation of New Jersey Application February 1, 1952, Serial No. 269,564

2 Claims. (Cl. 340—17)

This invention relates to seismic prospecting and has particular reference to apparatus for changing the resonant frequency of seismic detectors.

In seismic surveying operations it is sometimes desirable to change the resonant frequency of the detectors in order to change the low frequency filtering action provided by the detectors. This change in resonant frequency can be accomplished by changing either the amount of suspended mass in the detector, by changing the stiffness of the suspension spring suspending the mass in the detector or by changing both the suspended mass and the stiffness of the springs supporting the mass in the detector. Such changes, however, require adjusting each detector in a spread of detectors or requires replacing all of the detectors in a spread during surveying operations. The process of adjusting or of replacing all of the detectors in a spread involves considerable time and effort in that a spread of detectors may cover considerable area over the surface of the earth.

It is an object of the present invention to provide for the adjustment of the resonant frequency of a detector by means external to the detector.

It is another object of the present invention to provide for the remote control of the resonant frequency of all of the detectors in a spread of detectors.

It is a further object of the present invention to provide means whereby an operator stationed remotely from the detectors may vary or adjust the resonant frequency of all of the detectors in a spread simultaneously by the operation of a remote control.

These and other objects of the invention will become apparent from the following description when read in conjunction with the following drawings, in which.

Figure 1:
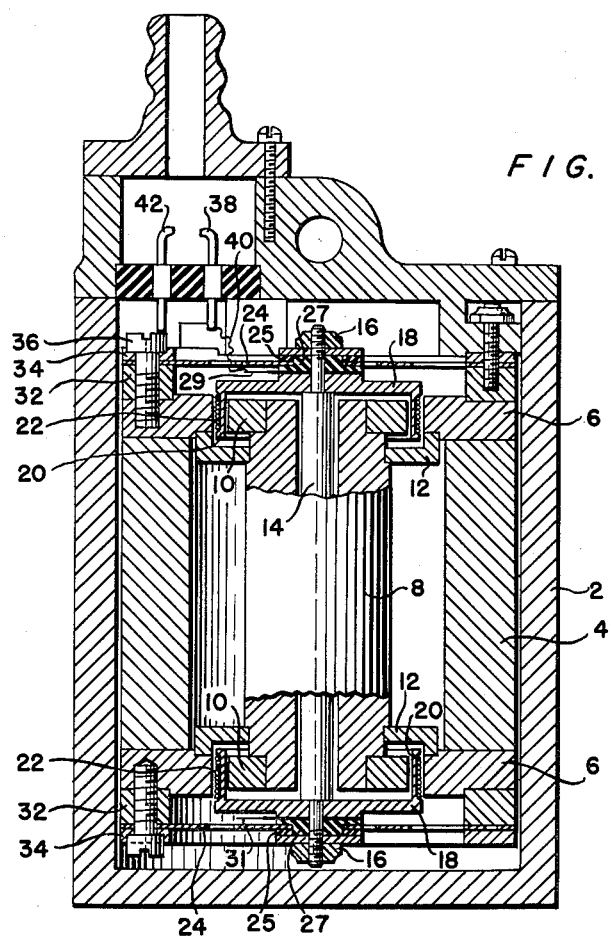
Figure 1 is a vertical axial section through a typical detector as may be employed with the present invention.

Referring to Figure 1 there is shown a seismic detector including a cylindrical housing 2 of non-magnetic material. Within the housing there is located a powerful permanent magnet in the form of a cylinder 4 which may be of Alnico or the like. Associated with the ends of this magnet are disc-shaped steel pole pieces 6. A central steel core 8 has fitted on its ends steel rings 10, and the assembly thus provided is secured in concentric relationship with the parts first described by means of spacers 12 of non-magnetic material, for example, aluminum, which have press fits on the core 8, and fit into shallow recesses in the pole pieces 6. The outer pole pieces 6 may be affixed to the magnet 4 while the spacer rings are deflected slightly by pressure applied to the pole pieces 6. The arrangement, as will be evident from the figure, provides a pair of annular air gaps between the respective members 6 and 10. The magnet 4, having its poles at its ends, thus provides a permanent magnetic field extending in an inward radial direction across one of these gaps, and in an outward radial direction across the other.

Figure 2:
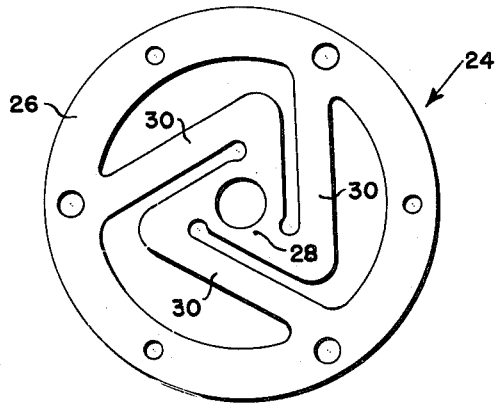
Figure 2 is a plan view of one of the suspension springs employed in the detector shown in Figure 1.

A suspended assembly within said housing includes the rod 14 of non-magnetic material to the ends of which are clamped by nuts 16 a pair of coil forms 18 having flanges 20 extending through the air gaps and arranged to support the pick-up coils 22. All of these various parts are of non-magnetic material. In particular, the coil forms are formed of anodized and, therefore, surface insulated aluminum alloy. At each of its ends this assembly is resiliently mounted by means of a flat spring arrangement indicated at 24 in Figure 2. As illustrated in that figure, an annular ring 26 is provided with fingers 30 which support a central portion 28 clamped to the moving assembly by nut 16. The clamping is effected between insulating washers 25 and 27. Upper and lower connecting lugs 29 and 31 are clamped between the coil forms and washers 27. The member 24 is preferably formed of a spring material such as beryllium copper in the form of a thin stamping to supply the necessary resiliency.

This type of detector has been fully disclosed in the patent application by Robert L. Henson, Jr., Serial No. 726,252, filed February 4, 1947, now U. S. Patent #2,533,249.

The electrical connections to the coils are made from the terminal 38 to a flexible pigtail 40 to the lug 29 which is electrically connected to one end of the upper coil 22. The other end of this coil is connected through rod 14 to an end of lower coil 22, and the other end of the latter is connected by a flexible pigtail and a lead (not shown) threaded upward through the magnet assembly to the terminal 42. External connections are made from the terminals 38 and 42.

Figure 4:
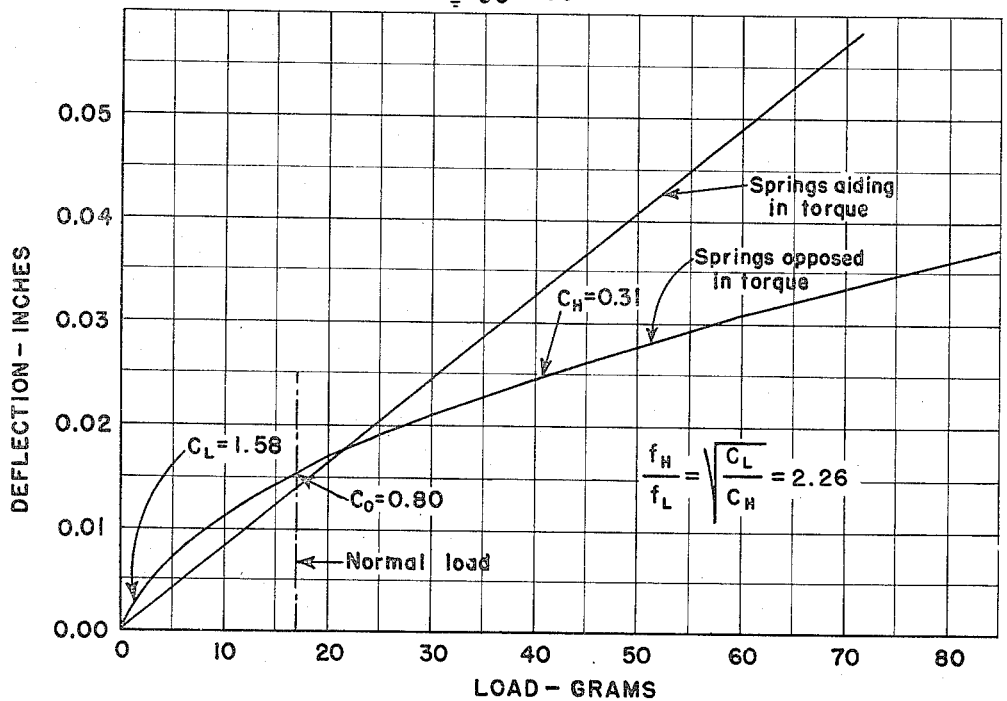
Figure 4 is a graph showing deflection-load curves for the suspension springs employed in the detector shown in Figure 1.

It will be apparent that as the central portion 28 of the spring is deflected above or below the annular ring 26 there will be a torque developed around the central portion 28 as the arms 30 are deflected. When two springs are employed, the effect of aiding or opposing torque will influence the force-deflection characteristic. The curves of Figure 4 show by way of example typical deflection-load characteristics of two springs when they are in aiding torque relation and when they are in opposing torque relation. These curves show that with the springs mounted in opposing relation, i. e., with the spring arms of the two springs extending in opposite relative directions, they provide a non-linear deflection-load ratio. When the springs shown in the drawing are mounted in aiding torque relation the deflection-load ratio is substantially linear for the range of deflection involved though beyond that range the characteristic may be non-linear. Additional non-linearity with springs in aiding torque relation can be obtained by shortening the length of the spring arms. Springs having about half the arm length of those shown in the drawing are sufficiently non-linear to permit an appreciable variation in frequency in the range of deflections used. The arrangement of springs in opposing torque relation, however, produces a greater non-linearity than is produced by short-arm springs in aiding torque relation and therefore is the preferred arrangement.

The two springs employed in the detector shown in Figure 1 are installed in opposing torque relation. The curve for opposed springs shows that the spring constant (proportional to the slope of the curve) at normal load-deflections $C_O = 0.80$. At substantially no load the spring constant is $C_L = 1.58$, and at a relatively high load the spring constant is $C_H = 0.31$. As shown in the Figure, the frequency ratio between this substantially no load deflection and the relatively high load deflection is 2.26 to 1, the mass being constant.

With the mass of the suspended system of the detector constant, the natural frequency of the detector can be varied by adding a force either opposite to or in the same direction as the force due to gravity exerted by the mass of the suspended system. This can be done by causing a steady current to flow through the detector coils 22 in one direction or the other.

Figure 3:
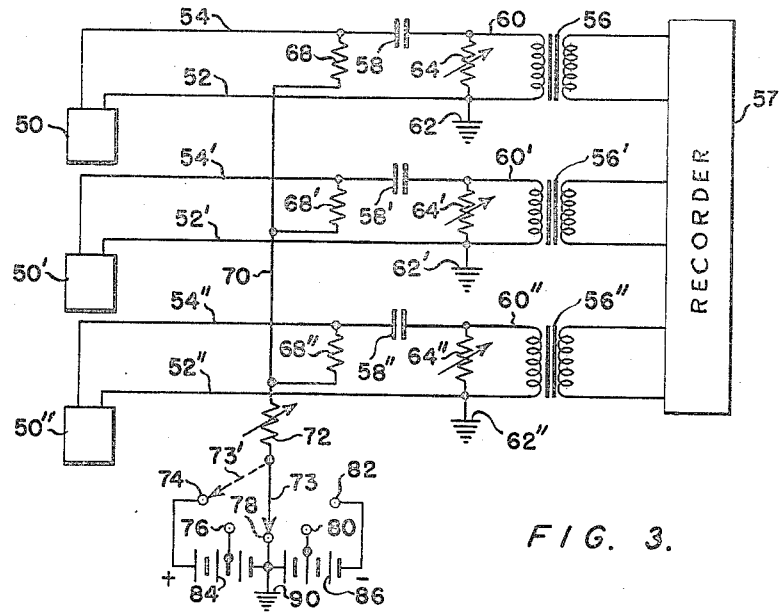
Figure 3 is a diagram of the electric circuit involved in the present invention.

In Figure 3 there is shown a plurality of seismic detectors 50, 50' and 50''. All of these detectors are of the type shown in Figure 1 and have their springs in opposed torque relationship providing non-linear response.

Connected to the detector 50 through line 52 is one side of the primary of the coupling transformer 56. In seismic surveying operations the output of the coupling transformers is conventionally connected to a multichannel recorder 57. Connected to the detector through line 54 is one side of the condenser 58, the other side of which is connected to the other side of the primary of the transformer 56 through the line 60. The line 52 is connected to ground at 62. Connected across the primary of the transformer between the line 60 and 52 is the damping resistor 64 for damping the detector 50. Connected to line 54 is one end of the resistor 68, the other end of which is connected to the line 70.

The lines 52 and 54 entering the detector 50 are connected interiorly in the detector to terminals such as shown at 38 and 42 in Figure 1 across which the detector coils are connected in series. Each of the other detectors 50' and 50'' has associated with it a circuit and circuit elements identical to those described in connection with detector 50. While this diagram has been drawn showing a group of three detector channels, it will be apparent that any number of detector channels may be connected together in similar fashion and one or a plurality of recorders may be employed.

Line 70 is connected through the variable resistor 72 and the movable contact 73 selectively to any one of the contact points 74—82. The contact point 78 is connected between a pair of direct current sources 84 and 86, and is connected to ground 90. The current sources 84 and 86 are so arranged that the contact 74 is of extreme positive potential, the contact 76 is of lesser positive potential, the contact 78 is of zero potential, the contact 82 of extreme negative potential and the contact 80 of lesser negative potential.

When it is desired to change the resonant frequency of the detectors, the operator at a location remote from the detectors adjusts the movable contact 73 to one of the contact points 74—82, depending upon the degree of change in resonant frequency desired. Assuming the movable contact 73 to be positioned on the contact point 74, as shown by construction line 73', a bias current will flow from the battery 84 through contact point 74, variable resistor 72 and the conductor 70, and distribute itself uniformly through each of the resistors 68, 68' and 68'', respectively. The component of the bias current flowing through resistor 68 will pass through line 54 through the coils in the detector 50 to the conductor 52 and to ground at 62. The ground current returns through ground connection 90 to the battery 84. The component of the current passing through each of the other resistors 68' and 68'' flows through the respective circuits associated therewith in the same fashion.

The resistors 68, 68' and 68'' are decoupling resistors to prevent one detector channel from feeding over into another detector channel through the bias current conductor 70. The condensers 58, 58' and 58'' are provided to prevent the bias current from flowing into the primary of the input transformers 56, 56' and 56'', respectively. The resistors 64, 64' and 64'' are damping resistors for the detectors. They are connected at the location shown rather than directly across the detector in order to keep the bias current from flowing through them. It is sometimes desirable to be able to vary these resistors in order to change the individual detector damping, and if the bias current flows through them, bias would be changed when the resistors are varied. The variable resistor 72 provides a fine control of the bias current in conjunction with the relatively coarse control provided by the contact points 74—82.

The biasing circuit disclosed herein may be modified to provide for proper bias for two detectors in parallel in each detector channel. The resistors 64, 64' and 64'' may be remotely grouped to provide for remote control of the damping provided for each of the various detectors. The circuit may be modified to permit individual control of the biasing current flowing through each of the various detectors. Various modifications may be made in the structure or form of the detector disclosed herein. It will be apparent that these and other modifications may be made in the embodiment of the invention disclosed herein without departing from the scope of the invention as set forth in the following claims.

What is claimed is:

1. Apparatus for seismic surveying including a detector comprising relatively movable elements providing an output signal due to their relative motion and means for yieldingly suspending one of said elements, said suspending means having non-linear load-deflection characteristics and comprising a pair of substantially flat spring means each including a plurality of outwardly extending arms, each of said arms having the radial axis of its outer end displaced from the axial plane of the radial axis of its inner end and the arms of one of the pair of spring means having their ends displaced oppositely to the displacement of the arms of the other of the pair of spring means, said spring means producing opposing torques around the axis of motion of said one of said elements when they are correspondingly simultaneously displaced, and means for loading said suspending means for adjustment of the resonant frequency of said detector by changing the effective spring constant of the suspending means.

2. Apparatus for seismic surveying including a plurality of detectors and circuits for connecting the output of each of said detectors to a recorder, each of said detectors comprising relatively movable elements providing an output signal due to their relative motion and means having non-linear load-deflection characteristics throughout its normal operating range for yieldingly suspending one of said elements, said suspending means comprising a pair of substantially flat spring means each including a plurality of outwardly extending arms, each of said arms having the radial axis of its outer end displaced from the axial plane of the radial axis of its inner end and the arms of one of the pair of spring means having their ends displaced oppositely to the displacement of the arms of the other of the pair of spring means, said spring means producing opposing torques around the axis of motion of said one of said elements when they are correspondingly simultaneously displaced, one of said elements including means producing a magnetic field, the other of said elements including a coil mounted in said magnetic field for relative movement therewith, the coils of each of said detectors being connected to its associated output circuit, a common adjustable current source connected to all of said coils providing a biasing current for loading said suspending means of each of said detectors for simultaneous adjustment of the resonant frequencies of each of said detectors by changing the effective spring constants of their suspending means, means for preventing cross-over feed of detector output signals between output circuits, and means for blocking the flow of biasing current into the output circuits during seismic recording.

References Cited in the file of this patent

UNITED STATES PATENTS

| | | |
|---|---|---|
| 2,533,249 | Henson | Dec. 12, 1950 |
| 2,562,983 | Clewell | Aug. 7, 1951 |
| 2,581,091 | Foster | Jan. 1, 1952 |
| 2,596,048 | Severs | May 6, 1952 |
| 2,600,967 | Chernosky | June 17, 1952 |
| 2,653,305 | De Shazo | Sept. 22, 1953 |